Whiteley, Fassler & Kelly,

Cider Mill.

No. 2,704 Reissued July 30, 1867.

Witnesses:
Thos Connolly
Thomas T. Parker

Inventors:
Wm N. Whiteley
Jerome Fassler
A S Kelly
By their atty
R. S. Smith

AM. PHOTO-LITHO. CO. N.Y. (OSBORNE'S PROCESS)

United States Patent Office.

WILLIAM N. WHITELEY, JEROME FASSLER, AND OLIVER S. KELLY, OF SPRINGFIELD, OHIO.

*Letters Patent No.* 40,987, *dated December* 15, 1863; *reissue No.* 2,704, *dated July* 30, 1867.

DIVISION B.

IMPROVEMENT IN CIDER-MILLS.

The Schedule referred to in these Letters Patent and making part of the same.

TO ALL WHOM IT MAY CONCERN:

Be it known that we, WILLIAM N. WHITELEY, JEROME FASSLER, and OLIVER S. KELLY, of Springfield, in the county of Clark, and State of Ohio, have invented a new and useful Improvement in Mills for Grinding Fruit, Vegetables, &c., and pressing the juice therefrom; and we do hereby declare the following to be a full, clear, and exact description of the same, reference being had to the accompanying drawings, in which—

Figure 1:
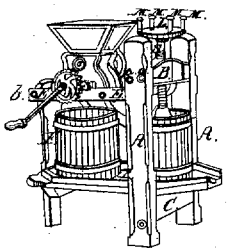
Figure 1 is a perspective view of our machine.
Figure 2:
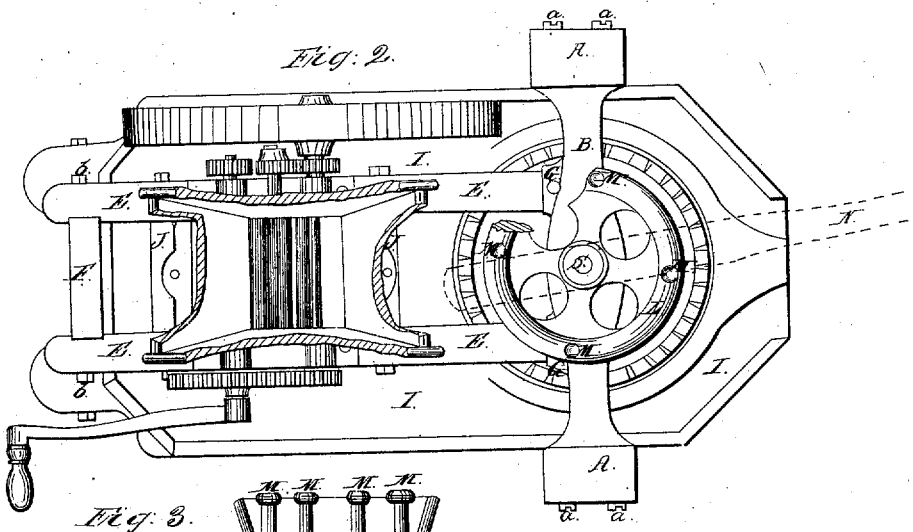
Figure 2 is a plan view of the same.
Figure 3:
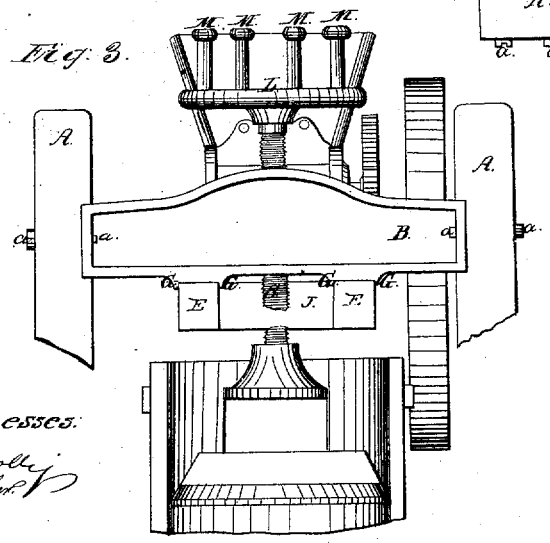
Figure 3 is a front elevation of a portion of the machine.

Our invention relates to that class of mills which are termed "portable" and "combined," because they are made in such proportions as to be easily transported from place to place without separation of their parts, and because the same framework supports both the grinding and pressing machinery, and that part of this invention, secured in this patent, relates particularly to the form and construction of the frame.

That others may understand the construction of our mill-frame, we will particularly describe it.

A A are the front posts of the mill-frame. These posts we make of wood, and connect them, near their lower ends, by the stout wooden girder C, and near their upper ends by the stout iron press-beam B. These posts and their connecting beams form the pressing-frame. The beam B swells, both vertically and laterally, at its central portion, in order to preserve its required strength. The screw S is passed through this enlarged portion, the female thread being cut in the sides of the hole through which it passes. The beam B has flanges along its edges and at its ends. The bolts *a a* pass through the posts A and into these latter flanges, so as to secure the beam and posts together. During the operation of pressing, the cheese-tub stands upon the platform I, and directly over the girder C beneath the screw S. At the rear of the machine is a single wide post, F, which supports that end of the machine. The platform I connects the post F, at its lower portion, to the girder C, and at its upper portion it is connected, at its upper end, to the beam B by the rails E E, and these are also provided with two cross-bars J J, upon which the grinding-box and hopper rest. These rails and the cross-bars J J we call the grinding-frames. The beam B is provided with lugs G G, on its under side, between which the ends of the rails E E are fitted, so that a single screw or bolt in each will be sufficient to retain them in place; the lugs G G effectually preventing any movement sideways. At the rear end of the frame, a single bolt, *b*, passes through both rails E and the post F, binding the three firmly together.

By constructing the frame of our machine in this way, several objects are secured: First, economy of material; because the opposite parts of the frame are brought as near together as possible, and thus the shortest practicable connecting-timbers are used. These timbers, being of short span, may also be smaller in dimension while preserving the requisite strength. Second, cheapness and facility of manufacture. As the cross-timbers are short and contain less material, they are less costly, and there is less labor required to finish them. The single post F occupies the position usually required by two posts and a connecting framework, in this machine dispensed with; less material and labor are therefore required in this part of the machine. Third, by bringing the side rails close together the grinding-rollers occupy the entire width between them, and the shafts of these rollers project beyond far enough to permit the entire gearing to be placed outside of the frame, so that it is free from contact with the expressed juice. Fourth. But an advantage, not inferior in importance to any of these, is the firm position upon any surface, gained by the use of only three feet or points of support. No cause will bring a machine to pieces more quickly than the racking of its joints, in consequence of an uneven foundation.

The cheese-hoops stand upon the platform I, one beneath the grinding-rollers, and one beneath the press-screw S, so that the operations of grinding and pressing may go on simultaneously. The screw S, at its lower end, is provided with a loose step or collar, which rests upon the follower, within the cheese-hoop, while pressing. This collar is attached to the screw by a screw or key which enters a channel cut in the lower end of the screw-rod. At the upper end of the screw is the hand-wheel L, by which the screw is operated. From its upper side project four pins M, which the hands may seize in turning the screw, or the lever N may be placed between them when the screw is to be forced down with power. The platform I has a raised edge, and at its front end a channel and spout to convey the expressed juice to a proper receptacle.

Having described our invention, what we claim as new, and desire to secure by Letters Patent, is—

1. The press-beam B, constructed with the lugs G G upon its lower part, and at a distance from its ends, as and for the purpose shown and described.

2. The arrangement of the posts A A, press-beam B, girder C, rails E E, post F, and platform I, to form the frame of a combined grinding and pressing fruit-mill, as set forth and described.

WM. N. WHITELEY,
JEROME FASSLER,
O. G. KELLY.

Witnesses:
T. J. PRINGLE,
GEO. H. BEMEUS.